Dec. 24, 1968   C. C. ANTHES   3,418,176
FUEL GAS MIXTURE AND PROCESS FOR USE THEREOF
Filed Oct. 20, 1965   3 Sheets-Sheet 3

INVENTOR
CLIFFORD C. ANTHES
BY Leo A. Plum, Jr.
ATTORNEY

United States Patent Office 3,418,176
Patented Dec. 24, 1968

3,418,176
FUEL GAS MIXTURE AND PROCESS FOR
USE THEREOF
Clifford C. Anthes, Union, N.J., assignor to Union Carbide
Corporation, a corporation of New York
Filed Oct. 20, 1965, Ser. No. 498,718
10 Claims. (Cl. 148—9)

ABSTRACT OF THE DISCLOSURE

A process for improving the spot heating effect produced by the heat from a flame formed from the combustion of an acetylene mixture and oxygen comprising the use of a critical gaseous composition of (A) about 7.5 to about 12.5 percent by volume hydrogen with from about 92.5 to 87.5 percent by volume acetylene, or of (B) about 17.5 to about 22.5 percent by volume hydrogen with from about 82.5 to about 77.5 percent by volume acetylene, by which the preheat pierce start time is minimized.

This invention relates to a process for heating objects and a fuel gas mixture for accomplishing the heating. More particularly this invention relates to a mixture of hydrogen and acetylene and a process utilizing such mixture to improve the heating effect over that which would be produced by the combustion of oxygen and acetylene.

It is well known that acetylene when burned with oxygen produces a very intense flame which is suitable for untold processes requiring the addition of heat. Examples of processes utilizing oxygen-acetylene flames include, among many others, welding, soldering, brazing and cutting of metals. Typically, a torch is used which functions to direct oxygen and acetylene from their respective storage facilities and to combine the oxygen and acetylene to produce a flame which is relatvely directional and coherent. The direction and coherency of the flame results from the velocity of the preflame constituents of oxygen and aceylene imparting inertia to the product of their combustion. The flame is generally brought to bear on a workpiece to perform a desired function.

In many heating applications utilizing a relatively directional and coherent oxygen-acetylene flame, a small area of a workpiece is heated at any one point in time. Welding and cutting are typical examples of such applications. In these processes it is very important from the viewpoint of economy of time and materials to bring the area subjected to the flame to a desired temperature as rapidly as possible. In continuous applications where new areas of a workpiece are constantly being brought under the influence of the flame, it is desired that these areas also be brought to temperature as rapidly as possible. It is apparent, then, that in any process wherein the heating of an object in a limited area is a concomitant part, economies are produced when the heating is accomplished as rapidly and as expeditiously as possible.

It is therefore the primary object of this invention to provide an improved process for rapidly heating a small area of metal with a relatively directional and coherent flame.

It is another object of the present invention to provide an improved fuel gas mixture particularly suitable for rapidly heating a small area of a workpiece with a relatively directional and coherent flame.

These and other objects, advantages and features will become more apparent from the following description, appended claims and drawings in which:

Briefly and in accordance with one aspect of the present invention, hydrogen and acetylene are mixed to form a fuel gas mixture. The resultant parts by volume of hydrogen in the mixture are from about 7.5 to about 12.5 or from about 17.5 to about 22.5 percent. The mixture of hydrogen and acetylene is burned in the presence of oxygen in a combustion zone to form a flame. The pre heat gas ratio, defined as the volume percent of oxygen gas divided by the gas volume percent of the fuel mixture, in general should be maintained within the range taught by the prior art. As will be subsequently shown, however, a slight increase of this ratio to effect oxygen enrichment will yield optimum performance. The flame is made relatively directional and coherent. The directional and coherent qualities being preferably produced by imparting a velocity to the hydrogen, acetylene and oxygen gases which supply the combustible mixture. The heat of the flame is thereupon brought to bear on a workpiece to accomplish its rapid heating.

Briefly and in accordance with another aspect of the present invention, an improved fuel mixture is provided which comprises hydrogen and acetylene with the hydrogen being present in the amount of from about 7.5 to about 12.5 percent by volume of the total volume of hydrogen and acetylene with about 10 percent being the preferred amount of hydrogen.

Another aspect of this invention provides an improved fuel mixture of hydrogen and acetylene, with the hydrogen being present in amounts of from about 17.5 to about 22.5 percent by volume of the total volume of hydrogen and acetylene, with about 20 percent being the preferred amount of hydrogen in acetylene for this range.

Figure 1:
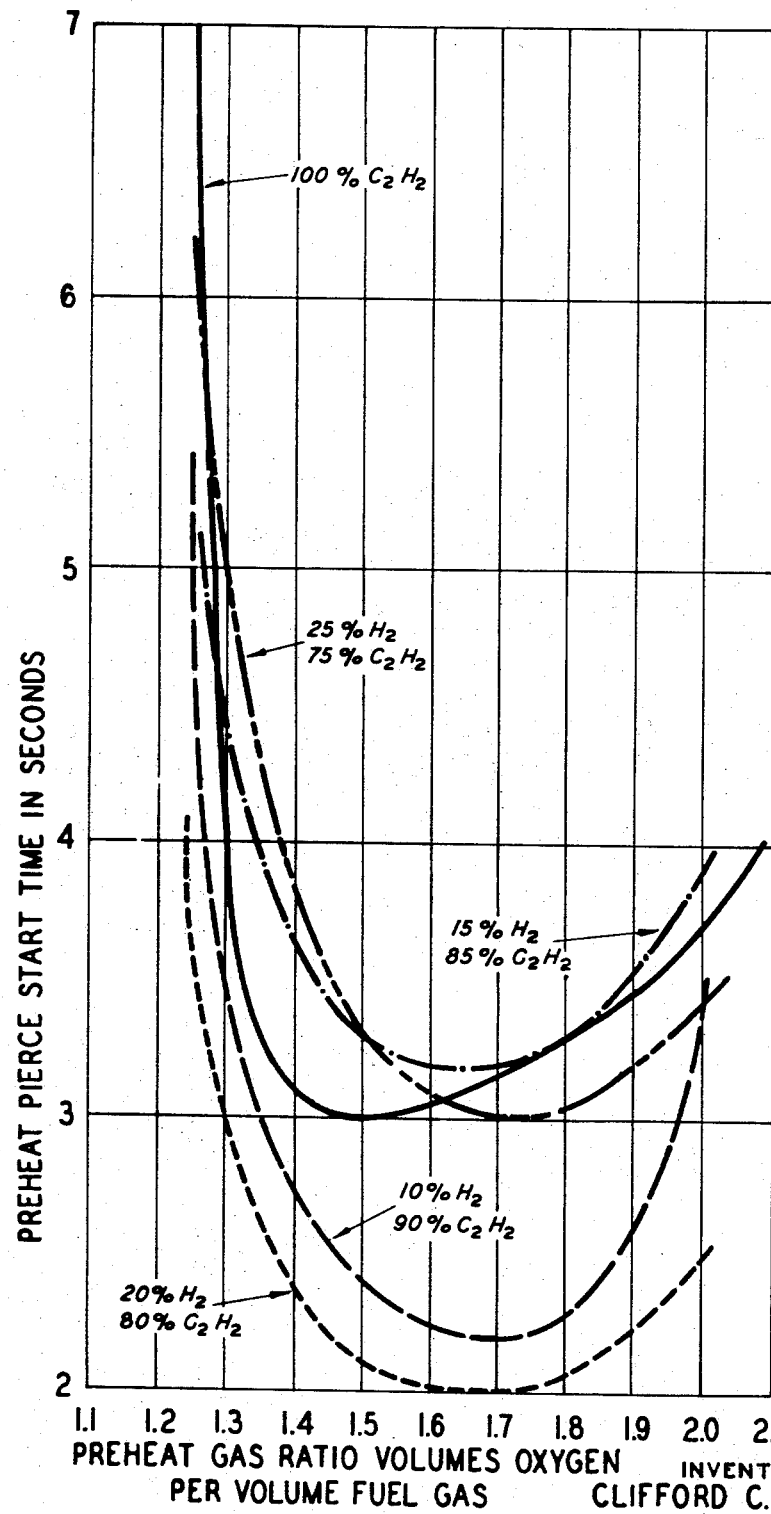
FIGURE 1 is a diagram in the form of a graph showing the superior heating effectiveness of the inventive composition.

Referring now to FIGURE 1 there is shown graphically the superior heating performance of the fuel gas mixtures of the present invention. The ordinate of this graph is preheat pierce start time. This parameter is defined as the time required to raise an area of material to its kindling temperature. The kindling temperature or point of a surface is that point at which an oxidizing stream will start to cut through the surface. The flame which is responsible for the temperature rise impinges directly upon the area and is adjusted such that the inner cone of the flame touches the workpiece. The abcissa of the graph is the preheat gas ratio defined as the number of volume moles of oxygen divided by the number of volume moles of acetylene and hydrogen. The workpieces used to arrive at the results shown by FIGURE 1 were two inch thick mild steel plates with a kindling temperature of approximately 1600° to 1800° F. The total fuel gas flow, acetylene and hydrogen, in every instance was 15 cubic feet per hour corrected to standard temperature and pressure. The gas velocity, volumetric flow rate divided by the cross sectional area of the flow, through the flame ports of the nozzles used with these tests was 300 feet per second. Gas velocity was held constant by varying the area of the flame ports to compensate for variations in velocity arising from variations in the amount of hydrogen in acetylene. (Shown by reference numeral 6 in FIGURE 3.) However, in order to maintain a fixed heating pattern, that is to maintain the heated area of the workpiece constant for each case, the nozzle hole circular diameter (the diameter of the circle described by the flame ports) was held constant. Thus it can be seen that all the parameters which would effect the preheat starting time, except for variations in the composition of the fuel mixture and the preheat gas ratio, were held constant. It should be understood that variations in parameters will affect preheat starting time and that therefore the figures are only illustrative. FIGURE 1 demonstrates that the preheat start time was improved dramatically over pure acetylene for a given preheat gas ratio for fuel gas mixtures of about 10 percent and about 20 percent hydrogen in acetylene and that a substantial improvement over oxygen-acetylene performance is experienced within the ranges of from about 7.5 to about 12.5 and 17.5 to about 22.5 percent hydrogen in acetylene. FIGURE 1 also demonstrates that the addition of about 15 percent hydrogen does not materially improve performance over pure acetylene. The reason for this unusual characteristic will be postulated subsequently.

Figure 2:
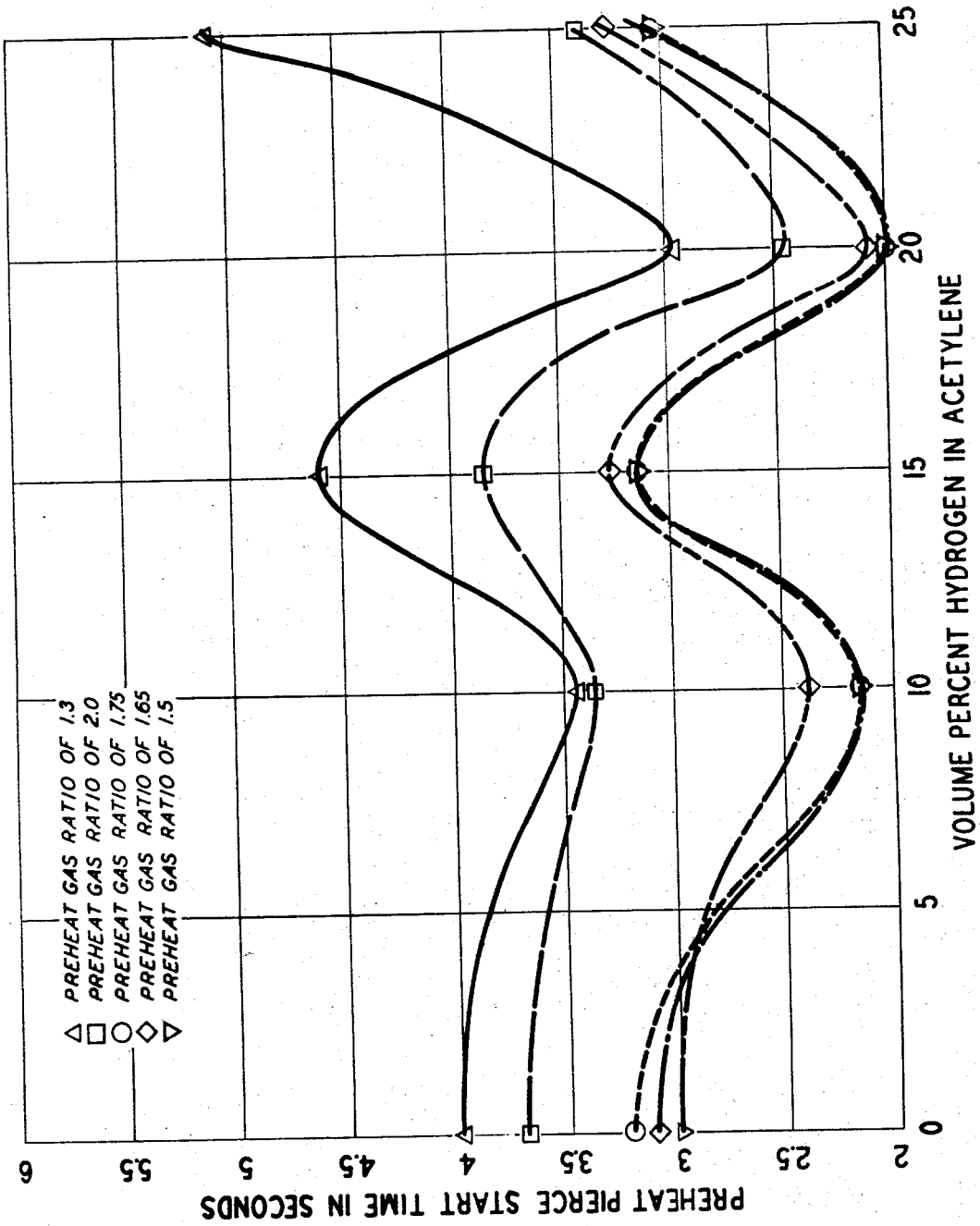
FIGURE 2 is another diagram in the form of a graph showing the superior heating effectiveness of the inventive composition.

FIGURE 2 shows even more dramatically the improved performance in preheat pierce start time of the fuel gas mixtures of this invention relative to pure acetylene. The curve shown is a cross plot of the data presented in FIGURE 1 and thus the operating variables were the same. The abcissa is the mole volume percent of hydrogen present in acetylene and each curve represents a constant preheat gas ratio as shown. It should be noted that performance is markedly improved in the vicinities where the volume percents of hydrogen in acetylene are about 10 and 20 percent and that performance suffers where the volume percent of hydrogen in acetylene is about 15 percent and above about 25 percent.

The preheat gas ratio affects the preheat pierce start time as can be readily seen from FIGURES 1 and 2. As is therein shown, the optimum preheat start times for differing volume percents of hydrogen in acetylene require slightly different preheat gas ratios and that the optimum preheat start time for a given amount of hydrogen in acetylene requires an increase in the ratio over that expected for pure acetylene. From the figures it can be seen that within the ranges of 7.5 to 12.5 volume percent hydrogen in acetylene, a preheat gas ratio of from about 1.4 to 1.9 is preferred to substantially reduce the preheat pierce start time. For 17.5 to about 22.5 volume percent hydrogen in acetylene, a preheat gas ratio of from about 1.4 to about 2.0 will yield substantially improved preheat pierce start times.

The reasons for the superior performance of the fuel gas mixture of this invention are not known with absolute certainty and therefore it is not desired that this invention be limited to the following theory. The heat content of the hydrogen and acetylene mixture is less than an equivalent volume of acetylene. This was shown when an object was heated to determine the amount of heat actually transferred to the whole of the object, as opposed to a limited area, and the object's heat content did not increase over similar heating with acetylene-oxygen flame. Thus, it is probable that the improved performance is due to an increase in the heat transfer effectiveness between the flame and the workpiece. It is felt that within the ranges of hydrogen in acetylene of this invention there are formed significant amounts of free-hydrogen radicals within the flame which enhance the heat transfer characteristics of the gas. Other factors must as well be considered to arrive at an optimum preheat start time. These factors are well known in the art and include preheat gas ratios, the distance between the nozzle from which the flame originates to the workpiece, the velocity of gases through the flame ports, and the intensity of the flame.

Figure 3:
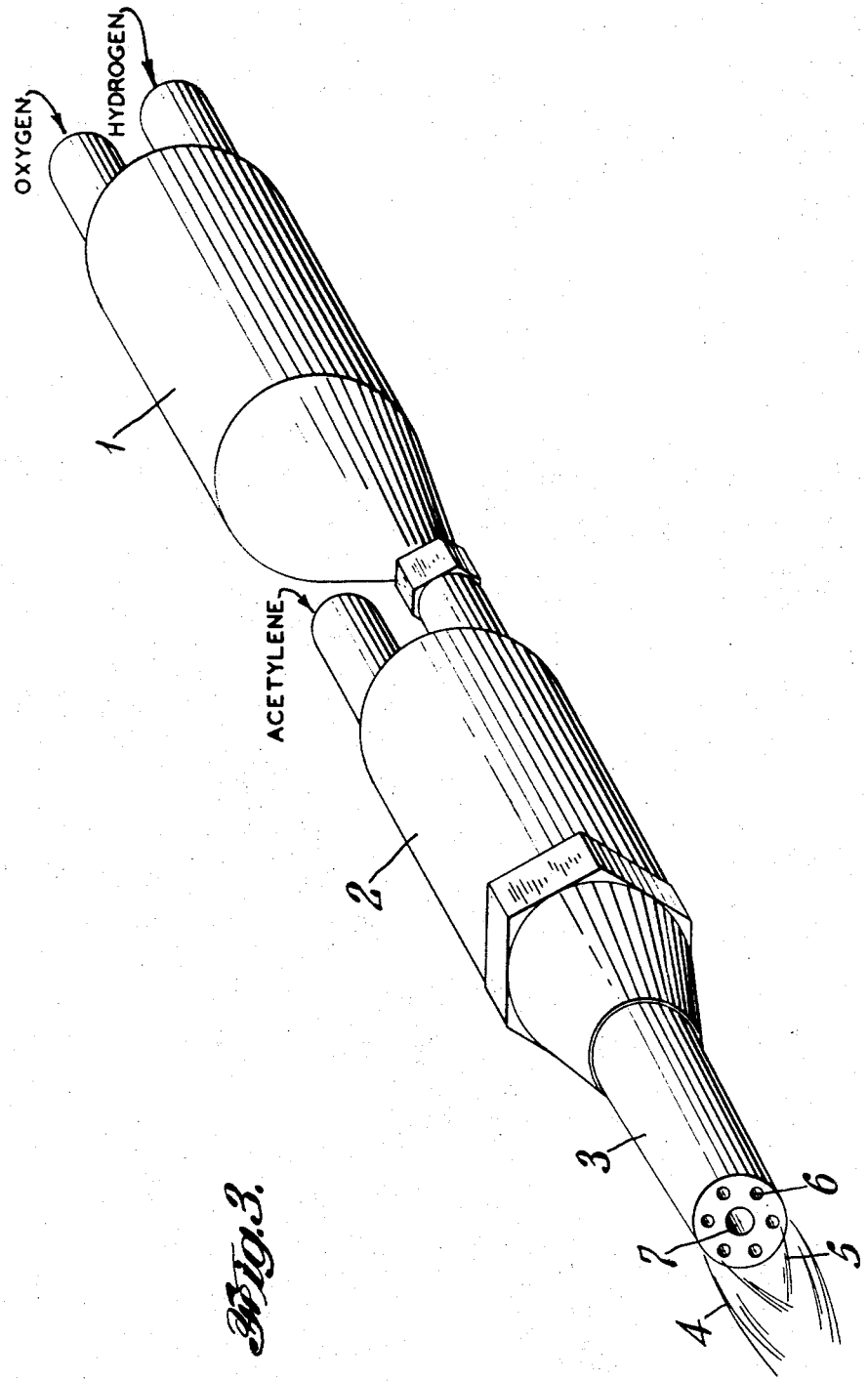
FIGURE 3 is a perspective view of a typical apparatus which can be used in the practice of this invention.

Apparatus which can be used to carry out the process of this invention is shown schematically in FIGURE 3. Inasmuch as this apparatus forms no part of the present invention and that in general it employs concepts well known in the art, it will not be described in detail. Oxygen from any convenient source such as a tank is supplied to injector 1 wherein it mixes with hydrogen which is also supplied from any convenient source. The oxygen and hydrogen so mixed then passes into a blowpipe 2 wherein acetylene is introduced to the mixture of the two gases resulting in homogeneous combustible composition of oxygen, hydrogen and acetylene. The order of mixing is immaterial and the acetylene and hydrogen could be mixed before the oxygen is introduced or all three mixed at one time. The resulting gases then pass through flame ports 6 in nozzle 3 into a combustion zone coterminous with flame 4 with inner cone 5. Pure oxygen can be introduced into the combustion zone through orifice 7 to supply an oxygen rich zone for cutting by any convenient means (not shown). In welding operations, the nozzle normally has only one orifice through which the combustible mixture of hydrogen acetylene and oxygen reaches the combustion zone.

It has been found that in addition to decreasing the preheat starting time within the ranges of hydrogen in acetylene of this invention, flame stability and flashback resistance are enhanced.

While the present invention has been described with reference to an illustrative apparatus and with certain variables held constant, it is to be understood that other devices and variation in parameter can be employed in the practice of this invention without departing from the scope and spirit of the appended claims.

What is claimed is:

1. A process for improving the spot heating effect produced by the heat from a flame formed from the combustion of acetylene and oxygen comprising the steps of:
   mixing from about 7.5 to about 12.5 percent by volume hydrogen with from about 92.5 to about 87.5 percent by volume acetylene to form a fuel gas;
   combusting at least a portion of the fuel gas with oxygen to produce a flame; and
   directing the flame at the spot to be heated.

2. A process according to claim 1 wherein the object is heated by forming the flame into a relatively directional and coherent stream and directing the heat from the stream onto the object.

3. A process according to claim 2 wherein the mole volume ratio of oxygen to fuel gas is from about 1.4 to about 1.9.

4. A process according to claim 3 wherein the fuel gas and oxygen are mixed to form a combustible mixture before actual combustion.

5. A process for improving the spot heating effect produced by the heat from a flame formed from the combustion of acetylene and oxygen comprising the steps of:
   mixing from about 17.5 to about 22.5 percent by volume hydrogen with from about 82.5 to about 77.5 percent by volume acetylene to form a fuel gas;
   combusting at least a portion of the fuel gas with oxygen to produce a flame; and
   directing the flame at the spot to be heated.

6. A process according to claim 5 wherein the object is heated by forming the flame into a relatively directional and coherent stream and directing the heat from the stream onto the object.

7. A process according to claim 6 wherein the mole volume ratio of oxygen to fuel gas is from about 1.4 to about 1.9.

8. A process according to claim 7 wherein the fuel gas and oxygen are mixed to form a combustible mixture before actual combustion.

9. A fuel gas mixture comprising from about 7.5 to about 12.5 percent by volume hydrogen with from about 92.5 to about 87.5 percent by volume acetylene.

10. A fuel gas mixture comprising from about 17.5 to about 22.5 percent by volume hydrogen with from 82.5 to about 77.5 percent by volume acetylene.

References Cited

UNITED STATES PATENTS

| | | | |
|---|---|---|---|
| 1,303,891 | 5/1919 | Harris | 48—197 |
| 1,325,116 | 12/1919 | Sebille | 48—197 |
| 1,505,340 | 1/1920 | Harris | 48—199 |

MORRIS O. WOLK, *Primary Examiner.*

R. E. SERWIN, *Assistant Examiner.*

U.S. Cl. X.R.

48—197, 199; 252—372